J. T. CLARK.
DEMOUNTABLE RIM.
APPLICATION FILED MAY 10, 1922.
1,429,901. Patented Sept. 19, 1922.
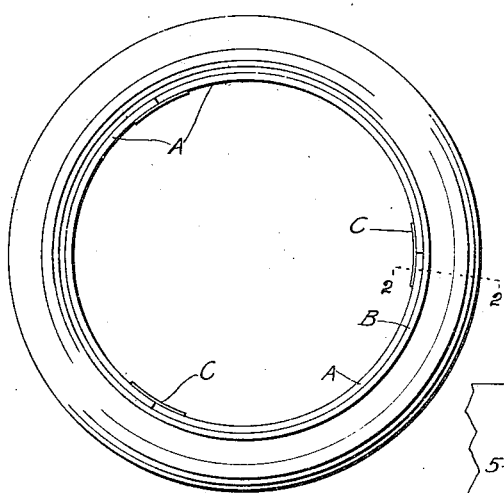
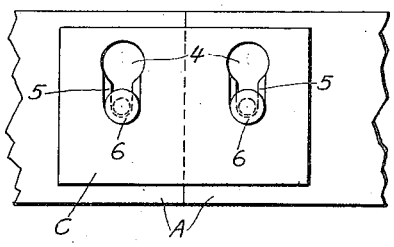
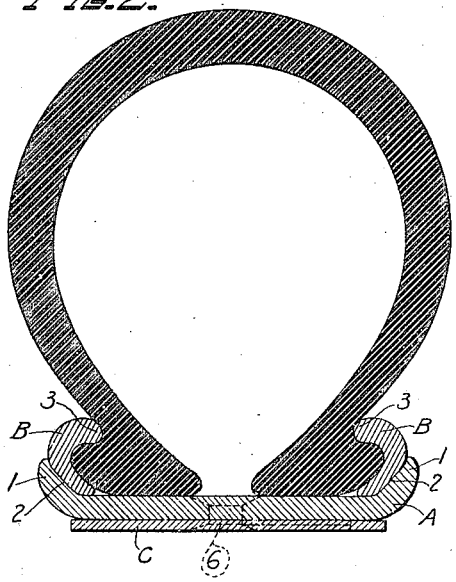
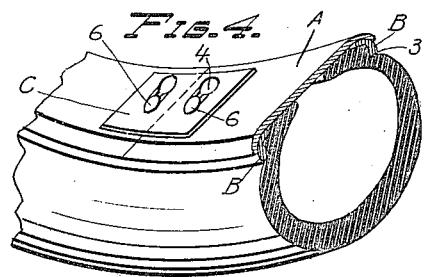
John T. Clark
INVENTOR
BY J. M. Thomas
ATTORNEY Patented Sept. 19, 1922.

1,429,901

UNITED STATES PATENT OFFICE.

JOHN T. CLARK, OF PROVO, UTAH.

DEMOUNTABLE RIM.

Application filed May 10, 1922. Serial No. 559,840.

*To all whom it may concern:*

Be it known that I, JOHN T. CLARK, a citizen of the United States, residing at Provo, in the county of Utah and State of Utah, have invented certain new and useful Improvements in Demountable Rims, of which the following is a specification.

My invention relates to rims for pneumatic tires for vehicles and has for its object to provide a demountable rim for wheels, such as automobile wheels, by a tire which is easily and quickly taken off and put on, and which will hold said tire firmly in place when inflated.

These and other objects which will be apparent, I accomplish with the device illustrated in the accompanying drawings in which similar letters and numerals of reference indicate like parts throughout the several views and as described in the specification forming a part of this application and pointed out in the appended claim.

In the drawings in which I have shown a substantial embodiment of my invention, Figure 1 is a side elevation of a tire in place on a rim constructed under my invention. Figure 2 is a transverse section on line 2—2 of Figure 1. Figure 3 is a side elevation of my invention. Figure 4 is a view in perspective of a section of an automobile tire and of my device in place therein.

The present invention consists of a metal rim A, cut into three sections equal in length with transverse abutting ends. The edges of said rim are outwardly flanged, as at 1, with the inner face 2 of each flange cut at an angle of about 45° from the bottom of the channel of the rim. Two annular rings B are carried within the channel of said rim, and an inwardly curved flange or gripping element 3 forms a portion of each ring B, which curved portion is engaged with the bead of a tire. The inner corner of the outer face of each of said rings is formed to conform with the angled face 2 of said rim and is intended to coact with said face 2 in preventing the edges of a tire from separating when inflated. A fastening plate C is detachably held at the junctions of said rim A, each of said plates consisting of a thin flat metal plate longitudinally curved to conform with the inner face of said rim. Each of said plates has two spaced apart holes 4 therein, and each of said holes is connected with a slot 5 having its inner edge or corner beveled. Rivets 6 having flat heads with conically shaped inner faces on the heads are secured in the end portions of each of said rim sections with a portion of each of said rivets protruding radially inward from the bottom of the channel in said rim, and the fastening plates are secured in place on the inner face of said rim by passing the holes 4 in said plates over the extending portions of said rivets and then sliding said plates transversely as to said rim to engage the protruding end portion of each rivet in its respective slot 5, thereby fastening the sections of the rim together within the said rings B.

In using my rim I remove two of said plates C by sliding each plate laterally on the shank of the rivets 6 until the heads of the rivets are within their holes 4. The plates may then be moved radially toward the axis of the rim, and the free end of one of said segments of the rim may be moved toward the axis of the rim, and all of the rim removed from the rings B. To place my rim within a tire the edges of the tire are engaged within the flanged portion 3 of each of said rings. Then by moving the edges of the tire toward each other the segments of the rim are placed within the rings B and expanded to form a circle. The fastener plates are then placed over the rivets 6 within the end portion of each rim section and driven laterally until said rivets are engaged in the slots 5, and when the tire is inflated the edges of the tire will press the said rings away from each other and in turn the said rings will contact with the outwardly extending flange 1 of the rim.

Having thus described my invention I desire to secure by Letters Patent and claim:—

In a demountable rim the combination of two annular rings having coacting tire engaging portions, a sectioned rim with outwardly extended flanges on each edge within said rings; rivets near each end of each section of said rim, with portions radially extended; and fastening plates spanning the ends of said rim sections having slotted holes in each to engage the extended portions of said rivets.

In testimony whereof I have affixed my signature.

JOHN T. CLARK.